United States Patent
Sivakumar et al.

(10) Patent No.: US 9,880,796 B2
(45) Date of Patent: Jan. 30, 2018

(54) RAPID VIEW MOBILIZATION FOR ENTERPRISE APPLICATIONS

(75) Inventors: Raghupathy Sivakumar, Atlanta, GA (US); Sandeep Kakumanu, Atlanta, GA (US); Cheng-Lin Tsao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 13/415,507

(22) Filed: Mar. 8, 2012

(65) Prior Publication Data

US 2012/0229499 A1   Sep. 13, 2012

Related U.S. Application Data

(60) Provisional application No. 61/450,408, filed on Mar. 8, 2011.

(51) Int. Cl.
*G09G 5/00* (2006.01)
*G06F 3/14* (2006.01)

(52) U.S. Cl.
CPC ......... *G06F 3/14* (2013.01); *G09G 2340/145* (2013.01)

(58) Field of Classification Search
CPC ......... G06T 11/60; G06T 19/00; G06T 11/00; G06F 9/44458; G06F 3/0481
USPC .......... 345/428, 619, 660; 715/249, 744–746
See application file for complete search history.

(56) References Cited

U.S. PATENT DOCUMENTS

| | | | |
|---|---|---|---|
| 6,882,659 B1 * | 4/2005 | Novak et al. | 370/466 |
| 6,915,328 B2 * | 7/2005 | Turnbull | 709/203 |
| 6,928,648 B2 | 8/2005 | Wong et al. | |
| 7,213,228 B2 | 5/2007 | Putterman | |
| 7,574,653 B2 * | 8/2009 | Croney et al. | 715/249 |
| 7,574,691 B2 | 8/2009 | Freitas | |
| 8,291,408 B1 * | 10/2012 | Czymontek | G06F 8/34 715/749 |
| 2006/0174026 A1 | 8/2006 | Robinson et al. | |
| 2006/0256130 A1 * | 11/2006 | Gonzalez | 345/619 |

(Continued)

FOREIGN PATENT DOCUMENTS

| | | |
|---|---|---|
| WO | WO 2010113160 A1 * | 10/2010 |
| WO | WO2011101691 A1 | 8/2011 |

OTHER PUBLICATIONS

Richardson, Tristan, "The RFB Protocol;" RealVNC Ltd.; Version 3.8; last updated Nov. 26, 2010; Available online at http://www.realvnc.com/docs/rfbproto.pdf; pp. 1-43.

(Continued)

*Primary Examiner* — Todd Buttram
(74) *Attorney, Agent, or Firm* — Smith, Gambrell & Russell, LLP (57) ABSTRACT

Certain embodiments of the invention may include systems, methods, and computer readable media for automatically converting a non-mobile computer platform application view to a mobile application view for use on a mobile device. The method can include transforming the non-mobile computer platform application view to the mobile application view based at least in part on differences between the-non mobile computer platform and the mobile device, wherein the differences comprise one or more of display capability, associated peripheral devices, bandwidth, or software libraries. The method can also include sending information associated with the transformed application view to the mobile device.

29 Claims, 3 Drawing Sheets

(56) References Cited

U.S. PATENT DOCUMENTS

| | | | |
|---|---|---|---|
| 2007/0061488 A1 | 3/2007 | Alagappan et al. | |
| 2007/0130523 A1 | 6/2007 | Ku et al. | |
| 2009/0013173 A1* | 1/2009 | Savage | 713/150 |
| 2009/0307658 A1* | 12/2009 | Freitas et al. | 717/113 |
| 2011/0025706 A1* | 2/2011 | Etelapera | 345/619 |
| 2011/0091112 A1* | 4/2011 | Engtrom et al. | 382/197 |
| 2011/0106876 A1* | 5/2011 | Delaney et al. | 709/203 |
| 2011/0252318 A1 | 10/2011 | Helms | |
| 2012/0092277 A1* | 4/2012 | Momchilov | 345/173 |
| 2012/0226994 A1 | 9/2012 | Lee | |

OTHER PUBLICATIONS

Barato, Ricardo A.; Potter, Shaya; Su, Gong; and Nieh, Jason; "MobiDesk: Mobile Virtual Desktop Computing Categories and Subject Descriptors;" MobiCom; Sep./Oct. 2004; pp. 1-15.

Zhang, Dongsong; "Web Content Adaptation for Mobile Handheld Devices;" Communications of the ACM; vol. 50, No. 2, Feb. 2007; pp. 75-79.

Mohomed, Iqbal; "Enabling Mobile Application Mashups with Merlion;" HotMobile, Feb. 2010; pp. 1-6.

Lamberti, Fabrizio and Sanna, Andrea; "Extensible GUIs for Remote Application Control on Mobile Devices;" IEEE Computer Graphics and Applications, vol. 28, No. 4, Jul./Aug. 2008; pp. 50-57.

Bila, Nilton, Ronda, Troy, Mohomed,Iqbal, Truong, Khai N. and De Lara, Eyal; "PageTailor: Reusable End-User Customization for the Mobile Web;" MobiSys, Jun. 2007, pp. 16-29.

\* cited by examiner

RAPID VIEW MOBILIZATION FOR ENTERPRISE APPLICATIONS

STATEMENT REGARDING FEDERALLY SPONSORED RESEARCH OR DEVELOPMENT

This invention was made with Government support under Grant Number CNS-1017234, awarded by the National Science Foundation. The Government has certain rights in the invention.

RELATED APPLICATIONS

This application is related to provisional application Ser. No. 61/450,408, filed on Mar. 8, 2011, entitled: "Rapid Application Mobilization," the contents of which are hereby incorporated by reference in their entirety.

FIELD OF THE INVENTION

This invention generally relates to viewing computer applications on mobile devices, and in particular, to systems and methods for converting a non-mobile computer platform application view to a mobile application view for use on a mobile device.

BACKGROUND OF THE INVENTION

The expanding mobile workforce is creating demand for enterprise-connectable mobile devices (smartphones, tablets, etc.) and application mobilization to enable workforce productivity in the field. Application mobilization is a general process that converts non-mobile software applications (for example, enterprise software running on a desktop computer or server) to mobile applications that can be accessible on a mobile devices. Existing techniques to mobilize enterprise applications for use on a smartphone, for example, can be prohibitively expensive and time consuming.

BRIEF SUMMARY OF THE INVENTION

Some or all of the above needs may be addressed by certain embodiments of the invention. Certain embodiments of the invention may include systems, methods, and computer-readable media for converting a non-mobile computer platform application view to a mobile application view for use on a mobile device.

According to an exemplary embodiment of the invention, a method is provided for automatically converting a non-mobile computer platform application view to a mobile application view for use on a mobile device. The method further includes transforming the non-mobile computer platform application view to the mobile application view based at least in part on differences between the-non mobile computer platform and the mobile device, wherein the differences comprise one or more of display capability, associated peripheral devices, bandwidth, or software libraries. The method further includes sending information associated with the transformed application view to the mobile device.

According to another exemplary embodiment, a system is provided. The system includes a mobile backend that includes a memory for storing computer-executable instructions. The mobile backend also includes one or more processors in communication with the memory. The one or more processors are configured for executing the computer executable instructions for automatically converting a non-mobile computer platform application view to a mobile application view for use on a mobile device, wherein converting comprises transforming the application view from the non-mobile computer platform to the mobile application view based at least in part on differences between the non-mobile computer platform and the mobile device, wherein the differences comprise one or more of display capability, associated peripheral devices, bandwidth, or software libraries. The one or more processors are also configured for sending information associated with the transformed application view to the mobile device.

According to another exemplary embodiment, one or more computer readable media are provided that include computer-executable instructions that, when executed by one or more processors, configure the one or more processors for converting a non-mobile computer platform application view to a mobile application view for use on a mobile device, wherein the converting comprises transforming the application view from the non-mobile computer platform to the mobile view based at least in part on differences between the-non mobile computer platform and the mobile device, wherein the differences comprise one or more of display capability, associated peripheral devices, bandwidth, or software libraries; and sending information associated with the transformed application view to the mobile device.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have not been shown in detail in order not to obscure an understanding of this description. The term "exemplary" herein is used synonymous with the term "example" and is not meant to indicate excellent or best. References to "one embodiment," "an embodiment,"

"exemplary embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, unless otherwise specified, the use of the term "mobile device" can be used to describe any device having a processor, memory, and a communications interface (including wireless and/or wired). Such devices include, but are not limited to cell phones, smartphones, tablets, card readers, displays, e-books, and the like.

An enterprise typically has a limited number of options for providing mobile applications for their mobile workforce. For example, the enterprise may purchase third party mobilized solutions from applications vendors to enable versions of the enterprise's conventional PC-based applications to run on mobile devices. Another approach is to have custom mobile applications built specifically for a given a set of tasks. Yet another approach is to rely on cross platform solutions like HTTP for access by multiple platforms, including mobile devices. Such mobilization methodologies, however, come with their respective limitations ranging from a non-trivial time taken for the application mobilization to occur, severely reduced functionality in the mobilized version compared to the PC counterparts, and a substantial cost for the effort of mobilization.

According to exemplary embodiments of the invention, rapid mobilization of applications may be realized without requiring re-development. Example embodiments utilizing thin client computing can enable the mobilization of an enterprise application by dynamically transforming the application interface to suit the mobile device. Example embodiments may also be used to enable the mobilization of a consumer application. In certain example embodiments, thin client traffic may be intelligently reduced. Example embodiments may provide turn-key transparent, and scalable solutions for secure, rapid mobilization of any enterprise application.

A full scale implementation of an exemplary experimental embodiment of the invention has been built and deployed using an Amazon Elastic Computing Cloud (EC2) for the backend and an Android operating system for the smartphone mobile device. According to an exemplary embodiment, a remote computing solution may be utilized, where the personal computer (or enterprise) version of the application is hosted in a cloud-based backend and an appropriate remote access is provided to the user on mobile device.

Unlike traditional thin-client computing approaches, exemplary embodiments of the invention may include dynamic interface transformation. For example, although the original PC version of the application runs on the backend, the application view and control as seen by the user is dynamically transformed in real-time to suit the mobile device environment. Also, unlike traditional thin-client computing approaches, exemplary embodiments of the invention may include intelligent traffic suppression. For example, embodiments of the invention rely on network connectivity to offer the remote computing interface, but according to exemplary embodiments, traffic required for the remote access may be reduced by leveraging knowledge of how the view is rendered on the mobile device. Furthermore, unlike traditional thin-client computing approaches, exemplary embodiments of the invention may include a transparent cloud-based backend. For example, exemplary embodiments utilize a backend that may be hosted on a cloud platform, which offers a transparent solution that allows for easy deployment of applications that need to be mobilized, secure access from the smartphone into the enterprise network, a shared application adaptation environment, and a scalable infrastructure.

The aforementioned embodiments and characteristics may enable the performance of the remote interaction with the enterprise software to be considerably improved over traditional solutions that use a simple thin-client computing interface. Furthermore, exemplary embodiments provide a reduction in traffic and processing overheads that can enable effective use with mobile devices having limited processing power and/or limited communications bandwidth.

Exemplary embodiments of the invention are directed to mobilization of enterprise applications. Windows-based personal computer (PC) applications were primarily tested primarily due to the current dominance of Windows applications in client platforms, but the principles that we disclose can be extended to applications based on other operating systems and web-based applications. Certain exemplary embodiments of the invention may be used in standalone-based applications. Other exemplary embodiments may be used in client-server based applications where the client side is mobilized.

Figure 1:
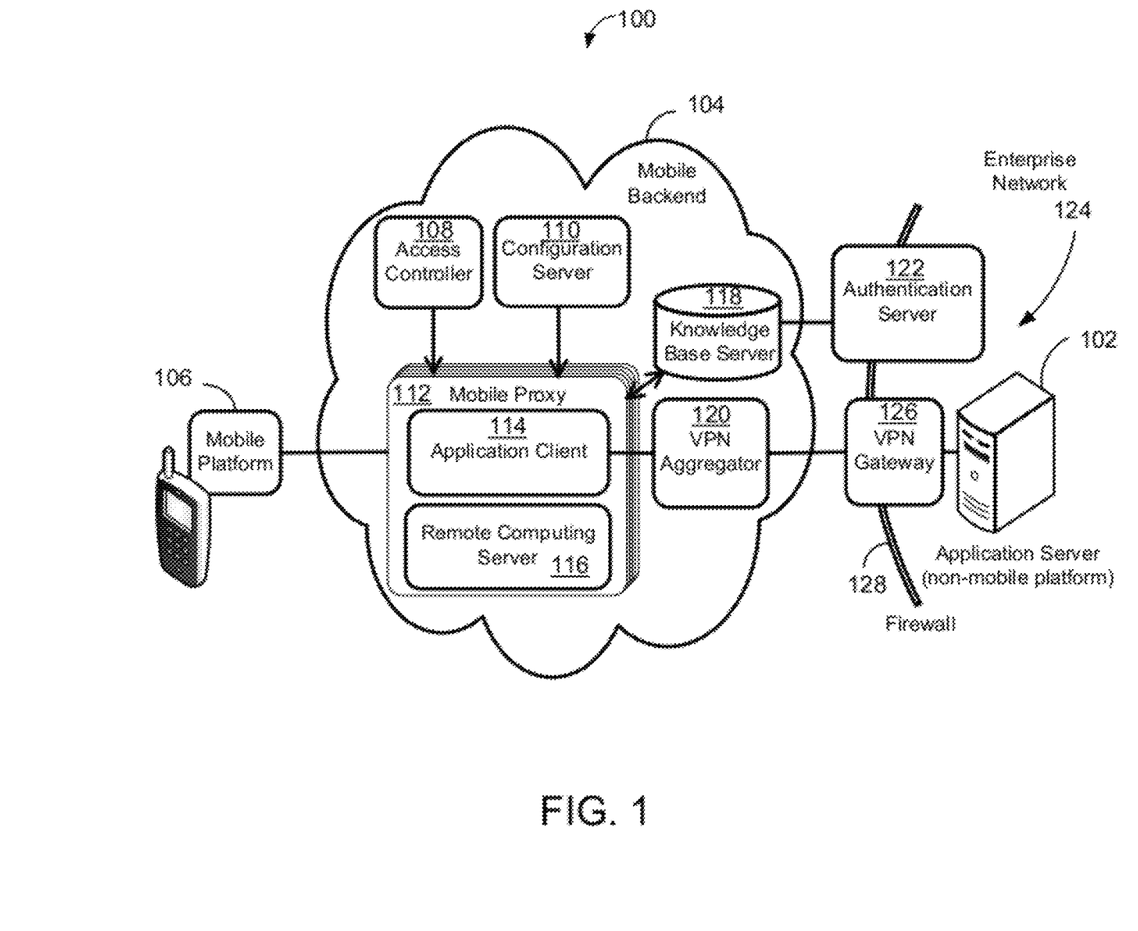
FIG. 1 is a block diagram of an illustrative network architecture, according to an exemplary embodiment of the invention.

FIG. 1 depicts an illustrative network architecture 100 for handling certain functions for use with the mobile platform 106, according to an exemplary embodiment of the invention. In an exemplary embodiment, a mobile backend 104 is hosted on a cloud-platform and includes a mobile proxy 112 that includes the application client 114 and the remote computing server 116. According to an exemplary embodiment, the mobile backend 104 may include an access controller 108, a configuration server 110, a knowledge base server 118 and/or a virtual private network (VPN) aggregator. According to an exemplary embodiment of the invention, multiple mobile proxies 112 may be configured to run simultaneously for handling multiple mobile platforms 106. In an exemplary embodiment, an application server 102 may reside on the enterprise network 124 and run the non-mobile application. According to an exemplary embodiment, a VPN gateway 126 may be utilized to communicate with the mobile backend 104. In an exemplary embodiment, the enterprise network 124 may include an authentication server 122 for communicating with the mobile backend 104 and authenticating sessions. Certain exemplary embodiments may provide communication between the mobile backend 104 and the application server 102 on the enterprise network 124 through a secure firewall 128. Exemplary embodiments provide the application (and hence the user) secure access to the application server 102 and other in-network resources residing within the enterprise network 124.

As used herein, the term "application" can refer to a standalone application or an application-client, and use the term "application-server" can refer to the server on which the application resides According to an exemplary embodiment, enterprise or stand-alone versions of applications may be hosted on the application server 102. The application server may host PC versions of the applications in one embodiment. In other embodiments, other versions of the applications may be hosted on the application server 102, and may include and without limit, versions such as Macintosh, Linux, UNIX, etc. In certain exemplary embodiments, the mobile backend 104 can be agnostic with respect to the application server 102.

According to an exemplary embodiment, support may be provided to allow for an optimized view or window into the application for the mobile device's user to view and control the application. In an exemplary embodiment, an optimize view or window may be presented to the mobile device. Briefly, providing the optimized view or window can include providing a dynamic user interface transformation of application views and controls appropriate for the mobile platform 106 and/or the mobile device. For example, mouse clickable tabs may be transformed into touchable buttons, and a pull-down menu may be transformed into a spinner wheel.

According to an exemplary embodiment, remote computing traffic may be reduced by intelligently suppressing and/or compressing the remote view information with knowledge of the mobile device environment. According to an exemplary embodiment, secure access into the enterprise network 124 may be used to overcome split tunnel issues to traverse VPN boundaries typically found in enterprise data centers to provide, for example, access to the application-server 102 and other resource such as network drives.

According to an exemplary embodiment of the invention, and for clarity, a baseline version is disclosed having a reduced set of aforementioned design elements, but that provides a thin client window into the application. In this example, the baseline may be set up to illustrate the motivation for the design elements. Embodiments of the invention utilize virtual network computing (VNC) as the underlying thin client solution for the application, but the design elements and concepts presented may be easily extended to other thin clients such as remote desktop protocol (RDP).

While thin client remote computing offers an easy solution to mobilize an application, the application's user interface can be quite unwieldy for use as-is due to the obviously varied constraints of the smartphone. For example, clicking on a menu item on a mobile device can involve multiple pinch-zooms and pans before being able to activate the item. Furthermore, the keyboard available on the mobile device can require multiple clicks to reach a needed key. In order to complete pre-defined tasks for common software, we have experimentally determined that the average number of actions required on a mobile device (such as a smartphone) is approximately 2.2 to approximately 3.8 times the number of actions required for the same task performed on a personal computer Exemplary embodiments of the invention provide the capability to perform dynamic interface transformation that dynamically, and in real-time converts the user interface of the application into a user interface appropriate for the mobile device. Exemplary embodiments of the dynamic transformation process can include a number of distinguishing features. For example, unlike traditional thin client solutions that tap into the view on the backend at the pixel or graphical primitives level, exemplary embodiments of the invention tap into the view at the level of user interface elements. This higher level of abstraction allows construction of a common user interface description. According to exemplary embodiments of the invention, the common user interface description may be sent to the mobile device where the view described is then rendered using elements available in the mobile device user interface library, thus making the view more tailored and useable while reducing overhead.

Note that this approach of decoupling the abstraction and rendering allows the same common user interface description to be rendered differently on different smartphone platforms. The user interface element information may be extracted via a user interface automation library provided by the operating system, such as Microsoft Active Accessibility or UI Automation on Windows PCs, KDE Accessibility on Linux PCs, or MAC OS X Accessibility Protocol on MAC PCs. The user interface element information may also be extracted via an application development framework, such as SAP Scripting for SAP applications or JavaScript Document Object Model for web applications.

According to exemplary embodiments, the transformation may be performed dynamically and automatically and there may be instances where user interface elements on the mobile device and requested from the mobile backend via the common user interface description are not available or recognized. To handle such scenarios exemplary embodiments of the invention employ a robust fallback strategy of transferring and rendering unrecognized user interface elements using the underlying thin client mechanism. Thus, exemplary embodiments of the invention are capable of rendering a single application view that is a composite of transformed and untransformed user interface elements. An example of a user interface that may require utilizing untransformed user interface elements to be rendered as-is the workspace in Microsoft Word.

According to exemplary embodiments of the invention, network connectivity may be a requirement. For example, most applications in an enterprise setting operate in a client server mode and hence connectivity is a requirement imposed even by the underlying application. For example, software versions experimentally tested and researched for this work included Microsoft Project and Intuit Quickbooks, which rely on connectivity to varying degrees while Microsoft Word does not require any connectivity. It is desirable to reduce the amount of traffic generated by the underlying thin client solution. In experimental testing, the average traffic data rate consumption for the three applications mentioned above is approximately 66 Kbps. While not prohibitive, the performance could be an issue in cellular data networks where the available per user capacity can easily dip below the required data rates. Furthermore, with increasing trends toward usage based billing in cellular data networks, reducing the required data rate may be desirable for cost reduction.

Exemplary embodiments of the invention provide the capability to intelligently optimize the traffic incurred by remoting. According to exemplary embodiments of the invention, client solutions are provided to perform short-term lossless compression of the view to be rendered. In other words, a particular view may be coded with respect to the last view, or differences between the current requested view an previous views. In the smartphone environment, the different views of an application are likely to repeat due to the lack of dynamics such as window re-sizing re-positioning. Exemplary embodiments of the invention provide a long term inter-view differential coding in addition to the short-term compression for user interface elements that are conveyed using the traditional thin client scheme. In an exemplary embodiment, the mobile client or mobile platform 106 maintains a dictionary of past views per application and the mobile proxy 112 performs its differential coding with the optimal past view and appropriately informs the client the index of the past view to use for the decoding.

An exemplary embodiment of the invention intelligently suppresses traffic when updates in the server side view are not likely to be visible at the client side. For example, such a situation may occur when local rendering of user interface elements blocks the visibility of updates, or when updates occur outside the bounding box of the visible application window.

According to exemplary embodiments of the invention, the mobile backend 104 of a cloud-based system may be realized. For example, while a backend may be implemented on a device within the enterprise network 104, such architecture may require each enterprise to explicitly go through the deployment process. Using the cloud-based approach, issues such as scalability (with respect to number of users) and associated hardware needed per user basis may be avoided. In certain exemplary embodiments, realizing the mobile backend 104 in a cloud-based service may simplify scalability without the need for any on-site deployment. According to exemplary embodiments, scalability may be implicitly handled by the elastic resources offered by the underlying cloud platform.

Exemplary embodiments of the invention provide a window or view into the application instance by employing both the dynamic interface transformation and traffic reduction. In addition, exemplary embodiments support virtual private network (VPN) friendly access. For example, most enterprises require VPNs for their employees to access application servers and other in-network resources such as network drives. However, exemplary embodiments of the invention may require mobile device users to attach to the mobile proxy 112, which then will have to access the enterprise network 124. However, this constitutes a split-tunnel VPN (a tunnel from the mobile platform 106 to the mobile proxy 104, and a tunnel from the mobile proxy 104 to the enterprise network 124 that is typically prohibited by VPN servers. In order to deal with this issue exemplary embodiments of the invention are designed to require users to authenticate with the mobile proxy 112 through the enterprise VPN, via an authentication server 122. For example, users receive an authentication ticket as part of this initial process, which they then use for connecting directly to the mobile proxy 112. This two-stage authentication thus requires users to validate themselves using their original VPN credentials but does not require the enterprise to share these credentials.

Exemplary embodiments of the invention provide scalable infrastructure. For example, mobile device user may be provided with an instance of the mobile proxy 112 in the form of a virtual machine (VM) on the cloud platform. In an exemplary embodiment, the launching of the VMs is the responsibility of the authentication server 122 but the scaling of the underlying infrastructure may be implicitly achieved by virtue of using an infrastructure-as-a-service cloud platform (e.g. Amazon EC2). The isolation of users within their respective VMs may provide enhanced security and configurability.

Exemplary embodiments of the invention provide sharing of non-data information across application instances to facilitate enhanced performance. For example, information such as suppressible views learned in one instance could be used by other instances without having to go through the learning process again.

Exemplary embodiments of the invention provide simple deployment with customizable user profiles. For example, enterprises may deploy applications through a simple interface that requires the selection of already available applications or the uploading of the application set-up package. The mobilization of an application can require approximately the same degree of effort as the installation of the application on a PC. Equally importantly, different user profiles with different application configurations may be created to allow for different functional roles. According to exemplary embodiments of the invention, when users authenticate, application instances may be launched and served as per their credentials and profile.

According to exemplary embodiments of the mobile backend 104 embodied in the cloud platform may enable the turn-key and transparent solution to enterprises. Several of the functional blocks associated with the network architecture 100 of FIG. 1 will now be described.

In an exemplary embodiment, the configuration server 110 may allow enterprise IT personnel to quickly mobilize the enterprise applications for the mobile workforce of the enterprise. For an enterprise with complex security policies, it would typically require the IT to customize the access rules to application and data for different groups of mobile employees. According to exemplary embodiments of the invention, the configuration server leverages 110 the OS virtualization capability of the cloud platform to facilitate the profile configuration process. By using OS virtualization, the IT can store a system image of the mobile proxy 112 and instantiate multiple instances from the same image to apply different configurations from the branch point. All the mobile proxy 112 images for different mobile employees may be stored in the cloud platform so that the corresponding resources for any employee can be instantly created on demand.

In an exemplary embodiment, the access controller 108 may provide security and access control for mobilized applications. For example, assuming that the enterprise uses an authentication protocol, the authentication can be achieved by encrypting a message with a secure key. Exemplary embodiments of the invention include four entities involved in the authentication: the authentication server 122, the access controller 108, the mobile proxy 112, and the mobile platform 106 (i.e., the mobile client). In an exemplary embodiment, the negotiation between the four entries follows the following steps: (1) the mobile client 106 contacts the authentication server 122 to authenticate the user's identity; (2) the authentication server 122 sends the ticket-granting ticket to the mobile client 106; (3) the mobile client 106 authenticates itself to the access controller 108 with the ticket; (4) the access controller 108 examines the ticket for validity, and it sets up the resources and interfaces of the mobile proxy 112 for the mobile client 106 to access the mobile proxy 112; (5) the access controller 108 sends the service ticket to the mobile client 106; and (6) the mobile client 106 accesses the applications residing in the mobile proxy 112.

According to exemplary embodiments of the invention, the access controller 108 takes care of the virtualization of the application proxies. For example, the access controller 108 instantiates new instances when the current instances reach certain constraints in serving new users. The constraints may be performance related such as CPU usage and memory usage or licensing constraints.

In an exemplary embodiment, the VPN aggregator 120 acts as a bridge between the mobile proxies 112 and the enterprise network 124. In an exemplary embodiment, the VPN aggregator 120 is a virtual machine instance specifically configured as a VPN client to establish a VPN connection to the enterprise VPN gateway. In an exemplary embodiment, the VPN client is configured to allow LAN access. The VPN aggregator 120 provides forwarding service for the mobile proxies 112 so that the application clients can access the application servers inside the enterprise network. According to exemplary embodiments of the invention, the forwarding can be done in two ways: (1) the mobile backend 104 may maintain a private IP address space, and the enterprise network may be configured to use the VPN aggregator as the routing gateway for the address space; and/or (2) The VPN aggregator 120 may perform NAT forwarding for the mobile proxies 112, which don't require extra configurations in the enterprise network.

Exemplary embodiments of the invention utilize a knowledge base 118 for the shared data associated with any learning mechanisms in the system. For example, traffic optimization learns the need for suppression from the usage history. The storage of suppression flags in a mobilized application can be shared among multiple users in the same enterprise. Exemplary embodiments may accelerate the learning process and have all users benefit from the applications usage of others in the same enterprise domain.

Figure 2:
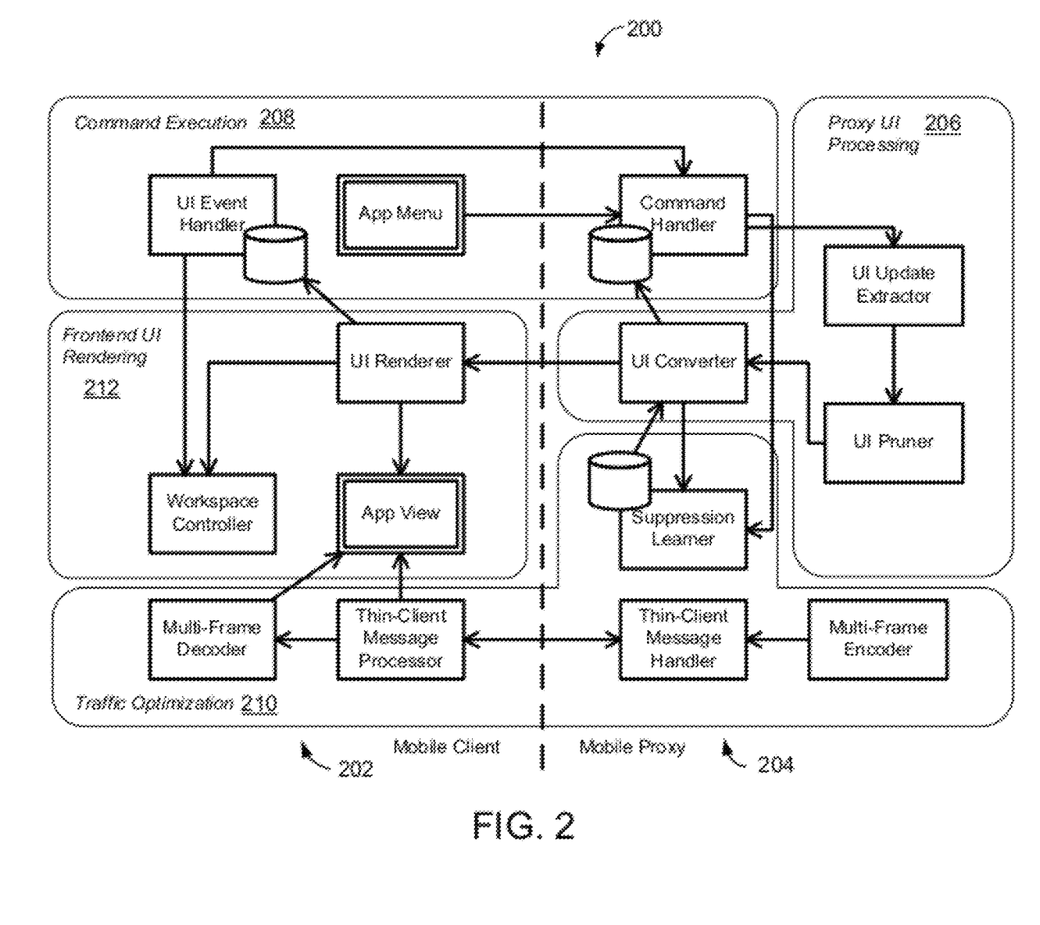
FIG. 2 is a block diagram of an illustrative core mobile system, according to an exemplary embodiment of the invention.

FIG. 2 depicts an exemplary embodiment of a core mobile system 200. According to exemplary embodiments of the invention, a mobile client 202 may reside on a smartphone or other mobile device or platform (as in the mobile platform 106 of FIG. 1). In an exemplary embodiment, the mobile client 202 may include a thin client frontend. Exemplary embodiments of the mobile proxy 204 include a corresponding thin client server to enable the baseline remote computing. Some of the different blocks and components for providing dynamic interface transformation and traffic optimization are depicted in FIG. 2. For example, a proxy user interface processing block 206 may include a user interface extractor, pruner, and converter. According to an exemplary embodiment, command execution 208 and traffic optimization 210 may be a shared function of the mobile client 202 and the mobile proxy 204. According to exemplary embodiments of the invention, the command execution block 208 may include a user event handler and an application menu in communication with a command handler. According to exemplary embodiments of the invention, the mobile client 202 may include a frontend user interface rendering block 212, which may include a user interface renderer, a workspace controller and an application view screen, or display.

According to exemplary embodiments of the invention, the traffic optimization block 210 may include a thin client message processor and a multi frame decoder on the mobile client 202 side, and a multi-frame encoder and a thin client message handle on the mobile proxy 204 side. In an exemplary embodiment, the traffic optimization block 210 may also include a suppression learner in communication with the command handler of the command execution block 208 and the user interface converter in the proxy user interface processing block 206.

As introduced earlier, exemplary embodiments of the mobile backend 104 may be realized as a transparent cloud-based solution by hosting the mobilization proxies as virtual machine instances that contain the application clients. In the following section, an explanation is presented to describe individual components or elements involved. Exemplary embodiments of the invention can be applied to any combination of PC platform, mobile platform, and thin client computing technology. Implementation details of an experimental prototype that utilized Window operating system as the PC platform, Android operating system as the mobile platform, and VNC as the thin client computing technology will be discussed below.

As described previously, a common user interface description can be used to transform the PC user interface to the mobile device user interface. The user interface can be described, according to certain exemplary embodiments, using a tree data structure of a single root object and several children objects. The children might in turn have more children objects. Each object can represent user interface control types, such as window, menu, dialog, button, check box, etc. Dynamic interface transformation is realized in accordance with exemplary embodiments of the invention with the functional blocks, as shown in FIG. 2. For example, a proxy user interface processing block 206 maps each PC user interface element to an object. Then the frontend user interface rendering block 212 renders each object as a native smartphone user interface element. According to an exemplary embodiment, the command execution block 208 reversely maps mobile device elements to PC elements to perform user interaction.

According to exemplary embodiments of the invention, the proxy user interface processing block 206 extracts the uniquely identifiable information of the various PC user interface elements and converts them to the common user interface description for generating a view on the mobile device. As used herein, a "view" may be defined as a set of PC user interface elements that will be rendered together in a single page on the mobile client 202, (or the mobile platform 106 of FIG. 1). According to exemplary embodiments of the invention, a view could denote a main window of an application, a drop-down menu, or a separate dialog.

In an exemplary embodiment, the update extractor within the proxy user interface process in block 206 may extract all the user interface elements belonging to current view shown on the PC. Accordingly, the current view may be identified by events that are triggered automatically by the operating system, or generated by other components of the solution.

According to exemplary embodiments of the invention, there are often a few user interface elements of a PC application in a given view that are unnecessary for the mobile client 202. For example, PC elements such as buttons for maximizing/minimizing a window are unnecessary to render on the mobile client 202. There are also some redundant user interface elements that serve as containers for other user interface elements that are also unnecessary for the mobile client 202. According to exemplary embodiments of the invention, the user interface pruner in the proxy user interface processing block 206 may help in eliminating such unnecessary user interface elements from the common user interface description.

According to exemplary embodiments of the invention, once all the PC user interface elements of a given view are extracted and pruned, the user interface converter within the proxy user interface processing block 205 creates a common user interface description for the entire view with the necessary tree data structure of objects. The common user interface description of the view is also sent to the mobile client 202 for rendering on the smartphone or other mobile device.

In accordance with exemplary embodiments of the invention, the frontend user interface rendering block 212 performs the rendering of the transformed user interface via the user interface renderer. According to exemplary embodiments of the invention, the rendering process of the transformed user interface elements are designed with a push model. For example, each view of a common user interface description is rendered as a separate full-screen page in the mobile client 202. In an exemplary embodiment, each type of object may be mapped into a native user interface element in the target mobile platform. When there is no direct mapping of an object in the target mobile platform, an element with similar functions may be utilized, or a custom element may be developed. For example, a PC user interface element called "combo box" may not have a direct equivalent in an Android platform, and hence it could be is transformed into a "Spinner" element, which pops up a selection list upon a click. Tool bar transformations, fonts, and other pop-up menus may be transformed or custom-built in similar manners according to exemplary embodiments of the invention.

According to exemplary embodiments of the invention, the workspace controller associated with the frontend user interface rendering block 212 seamlessly renders the workspace on the mobile client 202, and also sends user actions on the workspace such as mouse-clicks and keyboard entries to the thin client message handler associated with the traffic optimization block 210 on the mobile proxy 204. Several mechanisms may be added, according to exemplary embodiments, to improve usability. For example, when the user clicks on an editable element in the workspace, the controller can automatically open the software keyboard for the user. Also, in an exemplary embodiment, the controller also remembers the current position and zoom scale in workspace between view switching to provide seamless operation for the mobile user.

According to exemplary embodiments of the invention, the command execution block 208 interprets the user intent on the mobile client 202, and initiates the action required to fulfill the user intent. For example, when the user clicks on a user interface element or enters some text in an edit box on the mobile device app view, an "element-click" or a "set-text" command may be sent to the mobile proxy 204 respectively. In an exemplary embodiment, the event handler associated with the command execution block 208 maps the user interface element to the corresponding object and sends it to the command handler, which maps it to the element reference to perform the necessary action on the PC. According to exemplary embodiments of the invention, while the user interface converter and the user interface renderer perform transformation to and from the common user interface description, they store the mapping into a hash map, and both the user interface event handler and the command handler use the hash maps for quick retrieval. In Windows, APIs provided by user interface automation may be used for performing the actions.

In an exemplary embodiment, the command handler is also responsible for opening applications. For example, upon launching of the mobile client 202, the mobile app menu loads the profile of the mobile user and shows the list of applications available for use. When the user clicks on an application icon, an "application-open" command is sent to the command handler residing on the mobile proxy 204. According to exemplary embodiments of the invention, the command handler initiates a new instance of the application if not already opened or just brings the application to the foreground. The command handler then sends an event to the UI extractor asking it to extract the UI information of the main window.

In experiments associated with exemplary embodiments of the invention, virtual network computing (VNC) provided the underlying thin client solution in the prototype. In one example, screen updates may be performed with a polling mechanism. For example, the VNC client may request updates from the desktop screen of a remote PC where the VNC server resides. The server may pull the framebuffer, which is the complete pixel-by-pixel information of the current video display. The VNC server may compares the current framebuffer against the previous one, and it may send only an incremental update that contains the delta-difference from the previous framebuffer it has already sent to the client. Once the VNC client receives a framebuffer update, it may refresh the local screen display with the updates and requests for the next update.

We now turn to the details of traffic optimization. According to exemplary embodiments of the invention, the traffic optimization block 210 may be utilized to reduce the network traffic usage by the thin client solution for the workspace by reduced update scope, request suppression, and/or multi-frame encoding/decoding. According to exemplary embodiments of the invention, reducing screen updates in the thin client computing may be utilized to eliminate unnecessary spatial information. Unlike traditional thin client solutions that displays the full desktop screen, only the workspace of the application needs to be displayed using remote computing according to exemplary embodiments of the invention. For example, a normal VNC client requests the entire screen window as the scope of any updated content; however, in exemplary embodiments of the invention, the request message may be modified by the thin client message processor within the traffic optimization block 210, and the bounding box of the workspace may be used as the scope basis for update request.

According to exemplary embodiments of the invention, request suppression may be utilized to eliminate unnecessary traffic in the time domain. For example, request suppression may be associated with the traffic optimization block 210 in the mobile proxy 204 to suppresses not just screen updates from the thin client server but also the requests from the mobile client 202 when it is not displaying the workspace. For example, when menus/dialogs are opened and fully transformed, the common user interface description contains only transformed objects but not the workspace, and thus thin client computing is not needed in those views. To enable this suppression, a learning algorithm may be utilized to identify these scenarios, according to exemplary embodiments of the invention. We note that a menu/dialog is opened only when some user interface element is clicked on the PC application. According to exemplary embodiments of the invention, when a menu/dialog is opened for the first time, the suppression learner associates the menu/dialog view to the last user interface element clicked. When the same user interface element is transformed the next time around, the suppression flag is filled for the corresponding common user interface description object. According to exemplary embodiments of the invention, to enable the actual suppression mechanism in the VNC, a new message in the RFB protocol called "UpdateSuppress," for example, may be used as a message to instruct the thin client message handler to prevent updates to the previous update request received from the VNC client. Then, when a rendered user interface element that carries a suppression flag is clicked on the mobile client 202, the message processor is notified by the user interface event handler to perform update suppression. According to exemplary embodiments of the invention, the message processor may send an "UpdateSuppress" message and hold the new updates generated by the VNC client. When the UI renderer later shows a view with the workspace, the message processor sends a regular framebuffer "UpdateRequest" message to make the VNC server enter its normal state, where it can send regular updates of the workspace screen.

According to exemplary embodiments of the invention, multi-frame encoding/decoding may also be utilized to reduce traffic. As discussed earlier, exemplary embodiments of the invention leverage the long-term redundancy across multiple screen views to further reduce traffic consumption by the thin client computing. For example, both the VNC server and client maintain a consistent cache of multiple screen framebuffers that have been seen in the thin client connection. Whenever the server has to send a screen update to the frontend, it compares the current framebuffer with all the multiple screen framebuffers and identifies one where the delta-difference is the minimum. According to exemplary embodiments of the invention, the server encodes the update and instructs the client to use the correct reference screen to apply the update. The consistency of the screen caches at both sides is maintained with an updated message, for example, when the server stores the current screen into the cache, it adds the cache update information into the update message. In an exemplary embodiment, the "FramebufferUpdate" message is updated in the RFB protocol to include the source index and a destination index in the screen cache. The screen cache is maintained with a standard cache replacement algorithm used in microprocessor cache replacement policies, such as first-in-first-out (FIFO) or least frequently used (LRU).

Figure 3:
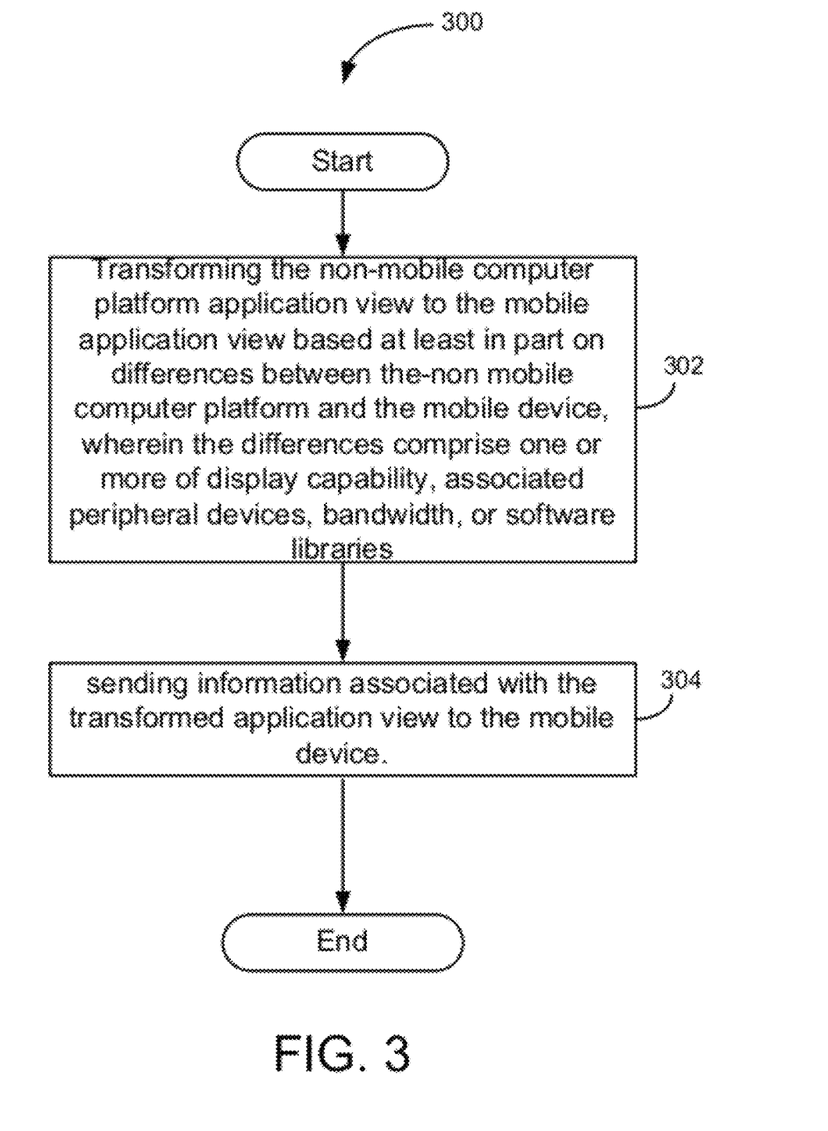
FIG. 3 is an illustrative method flow diagram, according to an exemplary embodiment of the invention.

An exemplary method 300 for automatically converting a non-mobile computer platform application view to a mobile application view for use on a mobile device will now be described with reference to the flowchart of FIG. 3. The method 300 starts in block 302, and according to an exemplary embodiment of the invention includes transforming the non-mobile computer platform application view to the mobile application view based at least in part on differences between the-non mobile computer platform and the mobile device, wherein the differences comprise one or more of display capability, associated peripheral devices, bandwidth, or software libraries. In block 304, the method 300 includes sending information associated with the transformed application view to the mobile device. The method 300 ends after block 304.

According to another exemplary embodiment, a system is provided. The system includes a mobile backend that includes a memory for storing computer-executable instructions. The mobile backend also includes one or more processors in communication with the memory. The one or more processors are configured for executing the computer executable instructions for automatically converting a non-mobile computer platform application view to a mobile application view for use on a mobile device, wherein converting comprises transforming the application view from the non-mobile computer platform to the mobile application view based at least in part on differences between the non-mobile computer platform and the mobile device, wherein the differences comprise one or more of display capability, associated peripheral devices, bandwidth, or software libraries. The one or more processors are also configured for sending information associated with the transformed application view to the mobile device.

According to another exemplary embodiment, one or more computer readable media are provided that include computer-executable instructions that, when executed by one or more processors, configure the one or more processors for converting a non-mobile computer platform application view to a mobile application view for use on a mobile device, wherein the converting comprises transforming the application view from the non-mobile computer platform to the mobile view based at least in part on differences between the-non mobile computer platform and the mobile device, wherein the differences comprise one or more of display capability, associated peripheral devices, bandwidth, or software libraries; and sending information associated with the transformed application view to the mobile device.

In an exemplary embodiment, transforming the application view from the non-mobile platform includes converting a personal computer (PC) application graphical user interface (GUI) to a mobile view for use on the mobile device, wherein the mobile device includes one or more of a smartphone, a tablet computer, a laptop computer, or a card reader.

According to exemplary embodiments of the invention, transforming the application view comprises identifying and associating one or more non-mobile application view elements with corresponding mobile device native view elements. In an exemplary embodiment, the identifying includes receiving mobile device native view element information from an operating system or application programming interface associated with the mobile device. In an exemplary embodiment, native view elements correspond to common user interface descriptors, and the information associated with the transformed application view that is sent to the mobile device includes one or more of the common user interface descriptors.

According to exemplary embodiments of the invention, transforming the application view includes dynamically extracting a rendered application view from the non-mobile computer platform; and sending the information associated with the transformed application view to the mobile device includes sending information for rendering graphical user interface elements corresponding to the extracted view on the mobile device. In an exemplary embodiment, dynamically extracting the rendered application view includes extracting rendered PC application GUI element information from a client server, a proxy server, or an application server. In an exemplary embodiment, transforming the application view includes recycling previously rendered views to reduce redundant data traffic, wherein recycling includes selecting information corresponding to one or more previously stored application views. In an exemplary embodiment, selecting includes comparing a common user interface descriptor associated with a current view rendering with one or more common user interface descriptors associated with previously stored view renderings.

In an exemplary embodiment, sending information associated with the transformed application view to the mobile device includes determining permissions using a ticket-based authentication protocol.

According to exemplary embodiments, certain technical effects can be provided, such as creating certain systems and methods that provide rapid mobilization of enterprise applications that allows instantaneous creation of a smartphone-version of PC applications without requiring any re-development and can approximate closely the performance of PC based usage of applications.

In exemplary embodiments of the invention, the network architecture 100 and the core mobile system 200 may include any number of hardware and/or software applications that are executed to facilitate any of the operations. In exemplary embodiments, one or more I/O interfaces may facilitate communication between the network architecture 100 and the core mobile system 200 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the network architecture 100 and the core mobile system 200. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the network architecture 100 and the core mobile system 200 inputs and outputs to one or more suitable networks and/or connections; for exemplary, the connections that facilitate communication with any number of sensors associated with the system. The one or more network interfaces may further facilitate connection to one or more suitable networks; for exemplary, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the network architecture 100 and the core mobile system 200 with more or less of the components illustrated in FIG. 1 or FIG. 2.

Certain embodiments of the invention are described above with reference to block and flow diagrams of systems and methods and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an exemplary, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for automatically converting a view of a non-mobile computer platform application to a mobile application view in real time for use on a mobile device as the application is running on non-mobile computer platform, the method further comprising:
   transforming the non-mobile computer platform application view to the mobile application view by identifying and associating one or more non-mobile application view user interface elements with corresponding mobile device native view user interface elements based at least in part on differences between the-non mobile computer platform and the mobile device, wherein the differences comprise one or more of display capability, associated peripheral devices, bandwidth, or software libraries; and
   sending information associated with the transformed application view to the mobile device, wherein the transformed application view is defined by the combination of the mobile device native view user interface elements.

2. The method of claim 1, wherein transforming the application view from the non-mobile platform comprises converting a personal computer (PC) application graphical user interface (GUI) to a mobile view for use on the mobile device, wherein the mobile device comprises one or more of a smartphone, a tablet computer, a laptop computer, or a card reader.

3. The method of claim 1, wherein the identifying comprises receiving mobile device native view user interface element information from an operating system or application programming interface associated with the mobile device.

4. The method of claim 1, wherein the mobile device native view user interface elements correspond to common user interface descriptors, and wherein the information associated with the transformed application view that is sent to the mobile device comprises one or more of the common user interface descriptors.

5. The method of claim 1, wherein transforming the application view further comprises dynamically extracting a rendered application view from the non-mobile computer platform before identifying and associating one or more non-mobile application view user interface elements with corresponding mobile device native view user interface elements; and wherein sending the information associated with the transformed application view to the mobile device comprises sending information for rendering graphical user interface elements corresponding to the extracted view on the mobile device includes sending the corresponding mobile device view user interface elements.

6. The method of claim 5, wherein dynamically extracting the rendered application view comprises extracting rendered PC application GUI element information from a client server, a proxy server, or an application server.

7. The method of claim 1, wherein transforming the application view further comprises recycling previously rendered views to reduce redundant data traffic, wherein recycling comprises selecting information corresponding to one or more previously stored application views.

8. The method of claim 7, wherein the selecting information comprises comparing a common user interface descriptor associated with a current view rendering with one or more common user interface descriptors associated with previously stored view renderings.

9. The method of claim 1, wherein sending information associated with the transformed application view to the mobile device comprises determining permissions using a ticket-based authentication protocol.

10. The method of claim 7, wherein recycling further comprises selecting information corresponding to one or more previously stored application views of more than one application.

11. The method of claim 4, wherein unnecessary or redundant non-mobile application view user interface elements are eliminated from the common user interface descriptors.

12. A system comprising:
a mobile backend configured to communicate with at least one non-mobile computer platform and a plurality of mobile devices, the mobile backend comprising:
a memory that stores computer-executable instructions;
one or more processors in communication with the memory, wherein the one or more processors are configured for:
executing the computer executable instructions for automatically converting an application view of a running program on the at least one non-mobile computer platform to a mobile application view for use on at least one of the plurality of mobile devices in real time, wherein converting comprises transforming the application view of the at least one non-mobile computer platform to the mobile application view by identifying and associating one or more non-mobile application view user interface elements with corresponding mobile device native view user interface elements based at least in part on differences between the at least one non-mobile computer platform and the at least one of the plurality of mobile devices, wherein the differences comprise one or more of display capability, associated peripheral devices, bandwidth, or software libraries; and
sending information associated with the mobile application view to the at least one of the plurality of mobile devices, wherein the mobile application view is defined by the combination of the mobile device native view user interface elements.

13. The system of claim 12, wherein transforming the application view from the at least one non-mobile platform comprises converting a personal computer (PC) application graphical user interface (GUI) to a mobile view for use on the at least one of the plurality of mobile devices, wherein the at least one of the plurality of mobile devices comprise one or more of a smartphone, a tablet computer, a laptop computer, or a card reader.

14. The system of claim 12, wherein the identifying comprises receiving mobile device native view user interface element information from an operating system or application programming interface associated with the at least one of the plurality of mobile devices.

15. The system of claim 12, wherein the mobile device native view user interface elements correspond to common user interface descriptors, and wherein the information associated with the mobile application view that is sent to the at least one of a plurality of mobile devices comprises one or more of the common user interface descriptors.

16. The system of claim 12, wherein transforming the application view of the at least one non-mobile computer platform comprises dynamically extracting a rendered application view from the at least one non-mobile computer platform before identifying and associating one or more non-mobile application view user interface elements with corresponding mobile device native view user interface elements; and wherein sending the information associated with the mobile application view to the at least one of a plurality of mobile devices comprises sending information for rendering graphical user interface elements corresponding to the extracted view on the at least one of the plurality of mobile devices includes sending the corresponding mobile device view user interface elements.

17. The system of claim 16, wherein dynamically extracting the rendered application view of the at least one non-mobile computer platform comprises extracting rendered PC application GUI element information from a client server, a proxy server, or an application server.

18. The system of claim 12, wherein transforming the application view of the at least one non-mobile computer platform further comprises recycling previously rendered views to reduce redundant data traffic, wherein recycling comprises selecting information corresponding to one or more previously stored application views.

19. The system of claim 18, wherein the selecting information comprises comparing a common user interface descriptor associated with a current view rendering with one or more common user interface descriptors associated with previously stored view renderings.

20. The system of claim 12, wherein sending information associated with the mobile application view to the at least one of the plurality of mobile devices comprises determining permissions using a ticket-based authentication protocol.

21. One or more non-transitory computer readable media comprising computer-executable instructions that, when executed by one or more processors, configure the one or more processors for:
converting in real time a view of a running non-mobile computer platform application to a mobile application view for use on a mobile device, wherein the converting comprises transforming the application view from the non-mobile computer platform to the mobile view by identifying and associating one or more non-mobile application view user interface elements with corresponding mobile device native view user interface elements based at least in part on differences between the non-mobile computer platform and the mobile device, wherein the differences comprise one or more of display capability, associated peripheral devices, bandwidth, or software libraries; and sending information associated with the transformed application view to the mobile device, wherein the transformed application view is defined by the combination of the mobile device native view user interface elements.

22. The non-transitory computer readable media of claim 21, wherein transforming the application view from the non-mobile platform comprises converting a personal computer (PC) application graphical user interface (GUI) to a mobile view for use on the mobile device, wherein the mobile device comprises one or more of a smartphone, a tablet computer, a laptop computer, or a card reader.

23. The non-transitory computer readable media of claim 21, wherein the identifying comprises receiving mobile device native view user interface element information from an operating system or application programming interface associated with the mobile device.

24. The non-transitory computer readable media of claim 21, wherein the mobile device native view user interface elements correspond to common user interface descriptors, and wherein the information associated with the transformed application view that is sent to the mobile device comprises one or more of the common user interface descriptors.

25. The non-transitory computer readable media of claim 21, wherein transforming the application view further comprises dynamically extracting a rendered application view from the non-mobile computer platform; and
wherein sending the information associated with the transformed application view to the mobile device comprises sending information for rendering graphical user interface elements corresponding to the extracted view on the mobile device.

26. The non-transitory computer readable media of claim 25, wherein dynamically extracting the rendered application view comprises extracting rendered PC application GUI element information from a client server, a proxy server, or an application server.

27. The non-transitory computer readable media of claim 21, wherein transforming the application view comprises recycling previously rendered views to reduce redundant data traffic, wherein recycling comprises selecting information corresponding to one or more previously stored application views.

28. The non-transitory computer readable media of claim 27, wherein the selecting comprises comparing a common user interface descriptor associated with a current view rendering with one or more common user interface descriptors associated with previously stored view renderings.

29. The non-transitory computer readable media of claim 21, wherein sending information associated with the transformed application view to the mobile device comprises determining permissions using a ticket-based authentication protocol.

* * * * *